(12) United States Patent
Lien et al.

(10) Patent No.: US 8,567,959 B2
(45) Date of Patent: Oct. 29, 2013

(54) OPTICAL SENSOR AND PROJECTION SYSTEM THEREOF

(75) Inventors: Jung-Tsun Lien, Hsin-Chu (TW);
Wei-Ting Yen, Hsin-Chu (TW);
Chien-Yi Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 332 days.

(21) Appl. No.: 12/903,221

(22) Filed: Oct. 13, 2010

(65) Prior Publication Data

US 2011/0273617 A1   Nov. 10, 2011

(30) Foreign Application Priority Data

May 10, 2010   (CN) .......................... 2010 1 0180458

(51) Int. Cl.
*G03B 21/00* (2006.01)
*G01J 1/00* (2006.01)
*H04N 9/73* (2006.01)

(52) U.S. Cl.
USPC ........ 353/42; 362/276; 356/139.03; 356/213; 73/1.45; 73/1.56; 73/514.26; 348/658

(58) Field of Classification Search
USPC ........ 353/42; 362/257, 276, 285; 356/139.03, 356/213; 73/1.45, 1.56, 1.85, 514.26; 348/658
See application file for complete search history.

(56) References Cited

U.S. PATENT DOCUMENTS

| 6,910,778 | B2 * | 6/2005 | Hamana et al. | 353/42 |
|---|---|---|---|---|
| 7,559,656 | B2 * | 7/2009 | Yumiki et al. | 353/42 |
| 2003/0112415 | A1 * | 6/2003 | Hsu et al. | 353/42 |
| 2003/0210229 | A1 | 11/2003 | Nishimura et al. | |
| 2004/0058729 | A1 * | 3/2004 | Shin-Pin | 463/25 |
| 2005/0078279 | A1 * | 4/2005 | Tamura | 353/42 |
| 2005/0099405 | A1 | 5/2005 | Dietz et al. | |
| 2005/0213082 | A1 * | 9/2005 | DiBernardo et al. | 356/139.03 |
| 2007/0216644 | A1 | 9/2007 | Nam et al. | |

FOREIGN PATENT DOCUMENTS

| CN | 1570707 | 1/2005 |
|---|---|---|
| CN | 1786981 | 6/2006 |
| CN | 1841290 | 10/2006 |
| CN | 1979329 | 6/2007 |
| JP | 2004110797 | 4/2004 |
| TW | 200944270 | 11/2009 |

OTHER PUBLICATIONS

"First Office Action of China Counterpart Application", issued on Jul. 20, 2012, p. 1-p. 16.
Manual of IN3902 Projector, InFocus Corporation, the first shipping date: Dec. 2009.
Dell 4610X Wireless Plus Projector User's Guide, the first shipping date: Aug. 2009.

* cited by examiner

*Primary Examiner* — Tony Ko
*Assistant Examiner* — Magda Cruz
(74) *Attorney, Agent, or Firm* — Jianq Chyun IP Office (57) ABSTRACT

An optical device is capable of controlling a projector, wherein the projector is capable of wirelessly receiving an image signal from a data source, combining an identification signal into the image signal to generate a projection signal, and projecting a projection image according to the projection signal. The optical device includes an optical sensor. The optical sensor is capable of sensing the identification signal of the projection image, outputting a detection signal corresponding to the identification signal and wirelessly transmitting the detection signal to the projector. A projection system including a projector and an optical sensor is provided as well.

9 Claims, 8 Drawing Sheets

OPTICAL SENSOR AND PROJECTION SYSTEM THEREOF

CROSS-REFERENCE TO RELATED APPLICATION

This application claims the priority benefit of China application serial no. 201010180458.1, filed on May 10, 2010. The entirety of the above-mentioned patent application is hereby incorporated by reference herein and made a part of this specification.

BACKGROUND OF THE INVENTION

1. Field of the Invention

The invention generally relates to an optical device and a projection system, and more particularly, to an optical device with an optical sensor and a projection system.

2. Description of Related Art

Figure 1:
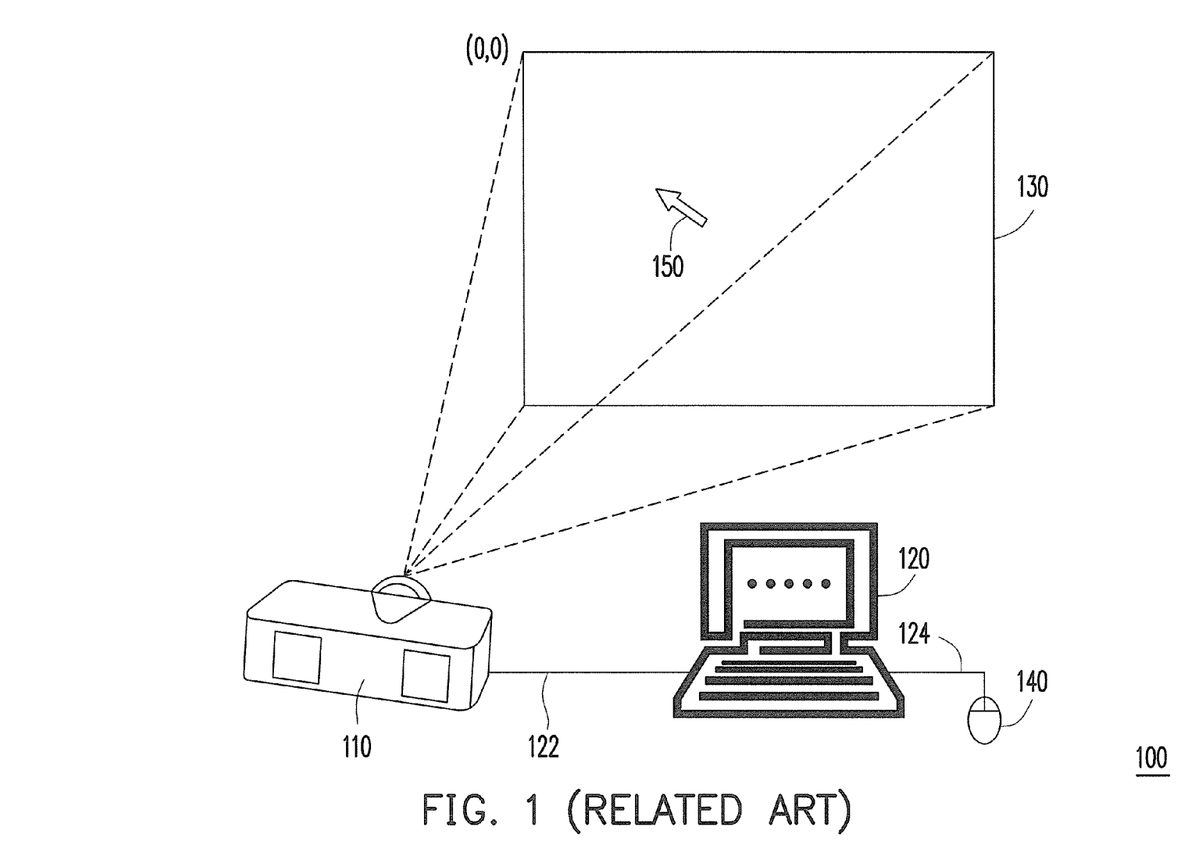
FIG. 1 is a diagram of a conventional projection system.

FIG. 1 is a diagram of a conventional projection system 100. Referring to FIG. 1, the projection system 100 includes a projector 110, a personal computer (PC) 120 and a mouse 140. The projector 110 is connected to the PC 120 through a transmission line 122, and the mouse 140 is connected to the PC 120 through a signal line 124. The PC 120 transmits an image signal to the projector 110, so that the projector 110 projects a projection image 130. A user operates the mouse 140 to generate a corresponding position signal so as to control the moving of a cursor 150 in the projection image 130.

From the user's viewpoint, the relative position and arrangement of the projector 110, the PC 120, and the mouse 140 are limited by the lengths of the transmission cable 122 and the signal cable 124. Thus, inconvenience in using the projection system 100 may be caused if the transmission cable 122 and the signal cable 124 are too short. On the other hand, the user needs to sit or stand near the PC 120 to operate the mouse 140 so as to control the cursor 150 when the user gives a briefing. However, it's difficult for the user to closely interact with other participants.

On pages 51-61 of the specifications of Dell's projector model 4610X, the above-mentioned connection between the projector and the PC is realized in a wireless manner so that the projector receives the image signal from the PC and then projects the image according to the received image signal. However, when the user utilizes the projector of the above-mentioned model, the moving of the cursor in the image is controlled by an indication device (for example, mouse) connected to the PC.

SUMMARY OF THE INVENTION

Accordingly, the invention is directed to an optical device with an optical sensor. The optical sensor senses an identification signal of a projection image of a projector and transmits the identification signal to the projector.

The invention is also directed to a projection system with an optical sensor and a projector. The optical sensor senses an identification signal of the projection image of the projector and transmits the identification signal to the projector, so that the projector determines the pointed position in the projection image by the optical sensor according to the identification signal.

Other objectives and advantages of the invention should be further indicated by the disclosures of the invention.

To achieve one of, a part of, all of the above-mentioned or other objectives, an embodiment of the invention provides an optical device for controlling a projector, wherein the projector is capable of wirelessly receiving an image signal from a data source, combining the identification signal into the image signal to generate a projection signal, and projecting a projection image according to the projection signal. The optical device includes an optical sensor. The optical sensor is capable of sensing the identification signal of the projection image, outputting a detection signal corresponding to the identification signal and wirelessly transmitting the detection signal to the projector.

An embodiment of the invention provides a projection system, which includes a projector and an optical sensor. The projector is capable of wirelessly receiving an image signal from a data source, combining an identification signal into the image signal to generate a projection signal, and projecting a projection image according to the projection signal. The optical sensor is capable of sensing the identification signal of the projection image, outputting a detection signal related to the identification signal and wirelessly transmitting the detection signal to the projector in a wireless manner. The projector herein determines the pointed position in the projection image by the optical sensor according to the detection signal so as to output a position message to the data source. The projector wirelessly receives the image signal from the data source and outputs the position message to the data source.

In an embodiment of the invention, the optical sensor has a photosensitive component, an analog amplifier, an analog-to-digital converter (ADC) and a wireless transmission module. The photosensitive component is capable of sensing the light from the position in the projection image so as to output a sensed signal. The analog amplifier is coupled to the photosensitive component for amplifying the sensed signal to generate an amplified signal. The ADC is coupled to the analog amplifier for converting the amplified signal into the detection signal. The wireless transmission module is coupled to the ADC for wirelessly transmitting the detection signal to the projector.

In an embodiment of the invention, the photosensitive component is a photodiode.

In an embodiment of the invention, the projector includes a first wireless transmission module, an ADC, a processor, a signal processing module, a projection module and a second wireless transmission module. The first wireless transmission module is capable of receiving the detection signal from the optical sensor. The ADC is coupled to the first wireless transmission module for converting the detection signal into a digital signal. The processor is coupled to the ADC for processing the image signal and the position message generated according to the digital signal. The signal processing module is coupled to the processor for combining the identification signal into the image signal so as to generate the projection signal. The projection module is coupled to the signal processing module for projecting the projection image according to the projection signal. The second wireless transmission module is coupled to the processor for wirelessly transmitting the position message to the data source and receiving the image signal from the data source.

In an embodiment of the invention, the projector wirelessly connects a plurality of data sources. The projector displays a plurality of display blocks in the projection image, and the display blocks are respectively corresponding to the data sources. When one of the display blocks is chosen, the data source corresponding to the chosen display block would transmit the image signal to the projector.

In an embodiment of the invention, the optical sensor includes at least one button. The button is capable of generating a control signal. The optical sensor wirelessly transmits the control signal with the detection signal together to the projector. The projector transmits the control signal to the data source to control the operation of the data source.

In summary, the embodiment of the invention has at least one of the following advantages. The optical device in the embodiment of the invention has an optical sensor. The optical sensor senses an identification signal of the projection image of the projector and transmits the identification signal to the projector. In addition, the projection system in the embodiment of the invention has an optical sensor and a projector. The optical sensor senses an identification signal of the projection image projected by the projector and transmits the identification signal to the projector, so that the projector determines the pointed position in the projection image by the optical sensor according to the identification signal. Hence, the cursor on the projection image would move following the variation of the pointed position in the projection image by the optical sensor. In this way, the user is able to wirelessly control the moving of the cursor on the frame so as to make the user more convenient for a presentation demo.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
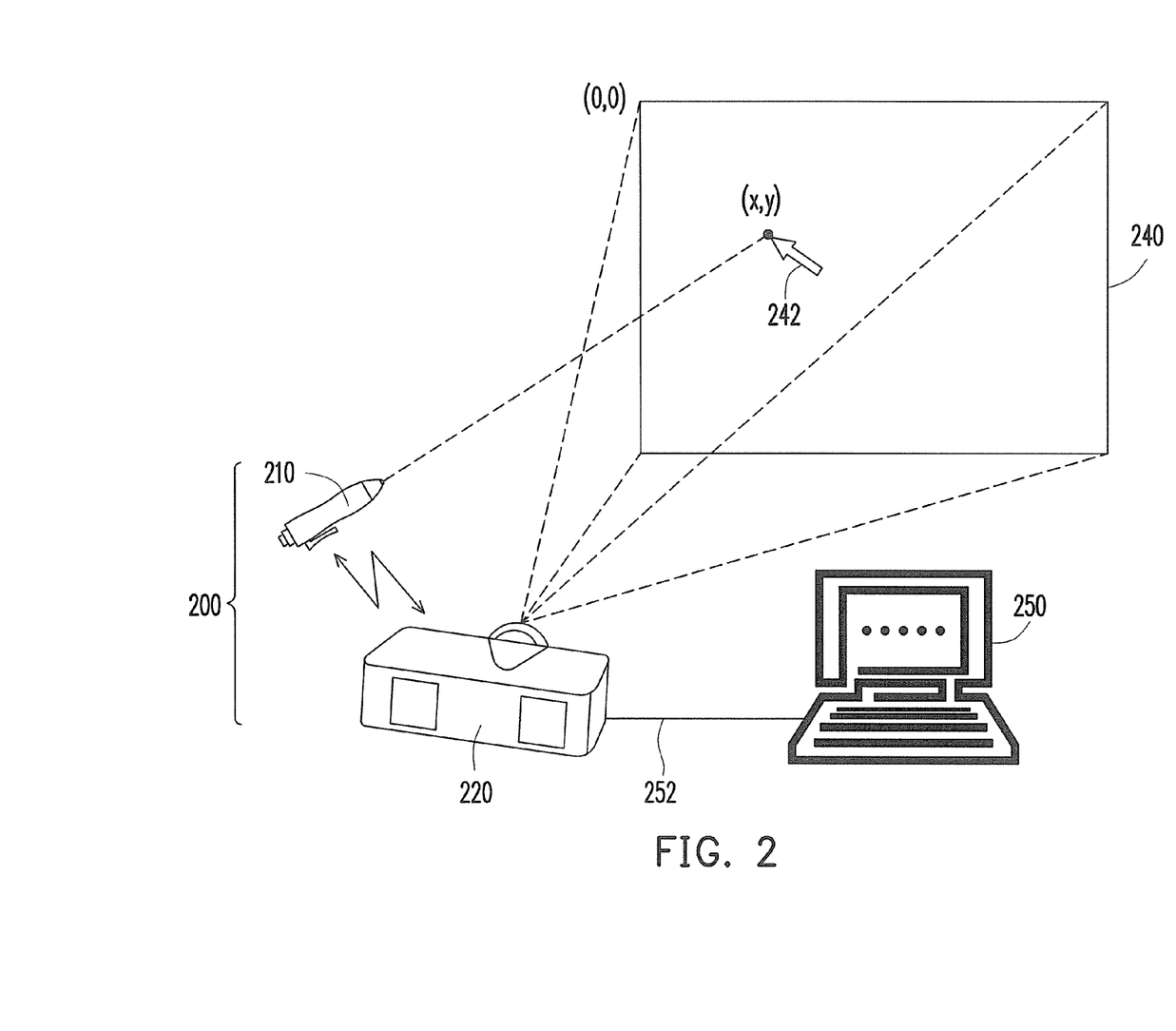
FIG. 2 is a diagram of a projection system according to an embodiment of the invention.

FIG. 2 is a diagram of a projection system according to an embodiment of the invention. Referring to FIG. 2, a projector 220 and an optical sensor 210 constitute a projection system 200. The projector 220 projects a projection image 240 according to the signal transmitted by a data source 250. The optical sensor 210 senses an identification signal of the projection image 240 and wirelessly transmits the identification signal to the projector 220. The projector 220 determines a pointed position (x, y) in the projection image 240 by the optical sensor 210 according to the detection result of the optical sensor 210 so as to output a position message to the data source 250 to further make the data source 250 control the moving of a cursor 242 in the projection image 240 according to the above-mentioned position message.

Figure 3:
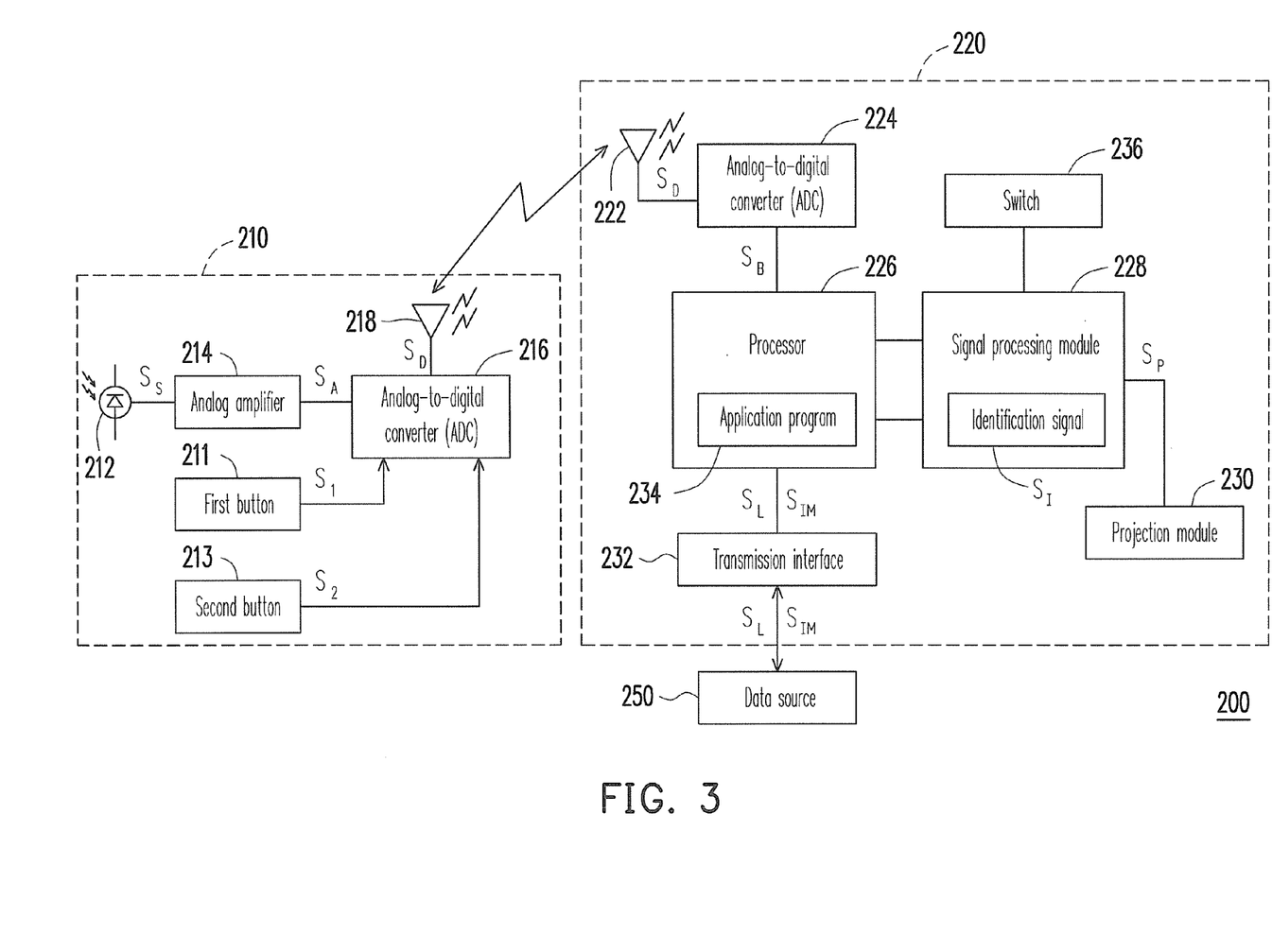
FIG. 3 is a function block diagram of the projection system of FIG. 2.

FIG. 3 is a function block diagram of the projection system 200 of FIG. 2. Referring to FIGS. 2 and 3, in this embodiment, the data source 250 is a PC, but not limited thereto. The data source 250 may be devices, such as DVD player, TV set, personal digital assistant (PDA) or mobile phone. The projector 220 is connected to the data source 250 through a transmission line 252 so that an image signal $S_{IM}$ is received from the data source 250 through the transmission line 252. The projector 220 combines the identification signal $S_I$ into the image signal $S_{IM}$ to generate a projection signal $S_P$. The projector 220 projects a projection image 240 according to the projection signal $S_P$. The identification signal $S_I$ has a coordinate message, with which the optical sensor 210 may generate a detection signal $S_D$ corresponding to the identification signal $S_I$ through sensing the projection image 240.

After the optical sensor 210 senses the identification signal $S_I$ of the projection image 240, the optical sensor 210 outputs the detection signal $S_D$ corresponding to the identification signal $S_I$ and wirelessly transmits the detection signal $S_D$ to the projector 220. The projector 220 determines the pointed position (x, y) in the projection image 240 by the optical sensor 210 according to the detection signal $S_D$ so as to output a position message $S_L$ to the data source 250. In the embodiment, the position message $S_L$ is transmitted from the projector 220 through the transmission line 252 to the data source 250. Then, the data source 250 gets the pointed position (x, y) in the projection image 240 by the optical sensor 210 according to the position message $S_L$. As a result, the cursor 242 moves to the position (x, y). In this way, a user may move the cursor 242 in the projection image 240 by means of the optical sensor 210.

In an embodiment of the invention, the optical sensor 210 has a photosensitive component 212, an analog amplifier 214, an ADC 216 and a wireless transmission module 218. The photosensitive component 212 is capable of sensing the light from the position (x, y) in the projection image 240 so as to output a sensed signal $S_S$. The analog amplifier 214 is coupled to the photosensitive component 212 for amplifying the sensed signal $S_S$ from the photosensitive component 212 to generate an amplified signal $S_A$. The ADC 216 is coupled to the analog amplifier 214 for converting the amplified signal $S_A$ into the detection signal $S_D$. The wireless transmission module 218 is coupled to the ADC 216 for wirelessly transmitting the detection signal $S_D$ to the projector 220. In an embodiment of the invention, the photosensitive component 212 is a photodiode for sensing the light from the position (x, y) in the projection image. The above-mentioned position (x, y) represents that the optical sensor 210 points at the location in the projection image 240. However, the photosensitive component 212 is not limited to the photodiode. The photosensitive component 212 may be, for example, charge coupled device (CCD) or CMOS sensor.

In addition, the projector 220 includes a first wireless transmission module 222, an ADC 224, a processor 226, a signal processing module 228, a projection module 230 and a transmission interface 232. The first wireless transmission module 222 is capable of receiving the detection signal $S_D$ from the optical sensor 210. The ADC 224 is coupled to the first wireless transmission module 222 for converting the detection signal $S_D$ into a digital signal $S_B$. The processor 226 is coupled to the ADC 224 for generating a position message $S_L$ according to the digital signal $S_B$. The processor 226 also processes the image signal $S_{IM}$ from the data source 250. The signal processing module 228 is coupled to the processor 226 for combining the identification signal $S_I$ into the image signal $S_{IM}$ so as to generate the projection signal $S_P$. The projection module 230 is coupled to the signal processing module 228 for projecting the above-mentioned projection image 240 according to the projection signal $S_P$. The transmission interface 232 is coupled to the processor 226 for transmitting the above-mentioned position message $S_L$ to the data source 250 through the transmission line 252.

In an embodiment of the invention, the ADCs 216 and 224 may be respectively a chip of model MSP430, the processor 226 may be a chip of model DDP2431, and the wireless transmission module 218 and the first wireless transmission module 222 may be respectively chips of model CC2500. In addition, the transmission interface 232 may be universal serial bus (USB) interface, video graphics array (VGA) interface, high-definition multimedia interface (HDMI) or S-video interface.

Referring to FIG. 3, the optical sensor 210 further has a first button 211 and a second button 213. The first button 211 is capable of generating a first control signal $S_1$ and the second button 213 is capable of generating a second control signal $S_2$, wherein the first control signal $S_1$ and the second control signal $S_2$ are equivalent to the left-button signal and the right-button signal of a mouse. The optical sensor 210 wirelessly transmits the first control signal $S_1$, the second control signal $S_2$ and the detection signal $S_D$ to the projector 220 through the wireless transmission module 218. After that, the projector 220 transmits the first control signal $S_1$ and the second control signal $S_2$ to the data source 250 to control the operation of the data source 250. Although the embodiment is depicted by the optical sensor 210 having both the first button 211 and the second button 213, but in other embodiments of the invention, the optical sensor 210 may have only one of the first button 211 and the second button 213 for implementation. Therefore, the number of buttons of the optical sensor 210 doesn't be limited.

In an embodiment of the invention, the projector 220 further has a switch 236 for enabling the signal processing module 228. When the switch 236 is turned on, the signal processing module 228 is enabled so that the signal processing module 228 combines the identification signal $S_I$ into the image signal $S_{IM}$ to generate the projection signal $S_P$; when the switch 236 is turned off, the signal processing module 228 is disabled so that the signal processing module 228 directly outputs the image signal $S_{IM}$, and at the time, the projection signal $S_P$ is the image signal $S_{IM}$ without the identification signal $S_I$.

In an embodiment of the invention, an application program 234 is stored in the processor 226 of the projector 220. When a connection between the projector 220 and the data source 250 is established, the data source 250 would download and install the application program 234. By executing the application program 234, the data source 250 updates the position message (x, y) depending on a received position message $S_L$ from the processor 226 and further updates the content of the image signal $S_{IM}$. In this way, the cursor 242 in the projection image 240 would move following the pointed position (x, y) by the optical sensor 210. In addition, in an embodiment of the invention, the application program 234 may be saved in a storage device (not shown) out of the processor 226, and the data source 250 downloads the application program 234 from the above-mentioned storage device and, then installs the application program 234.

Figure 4:
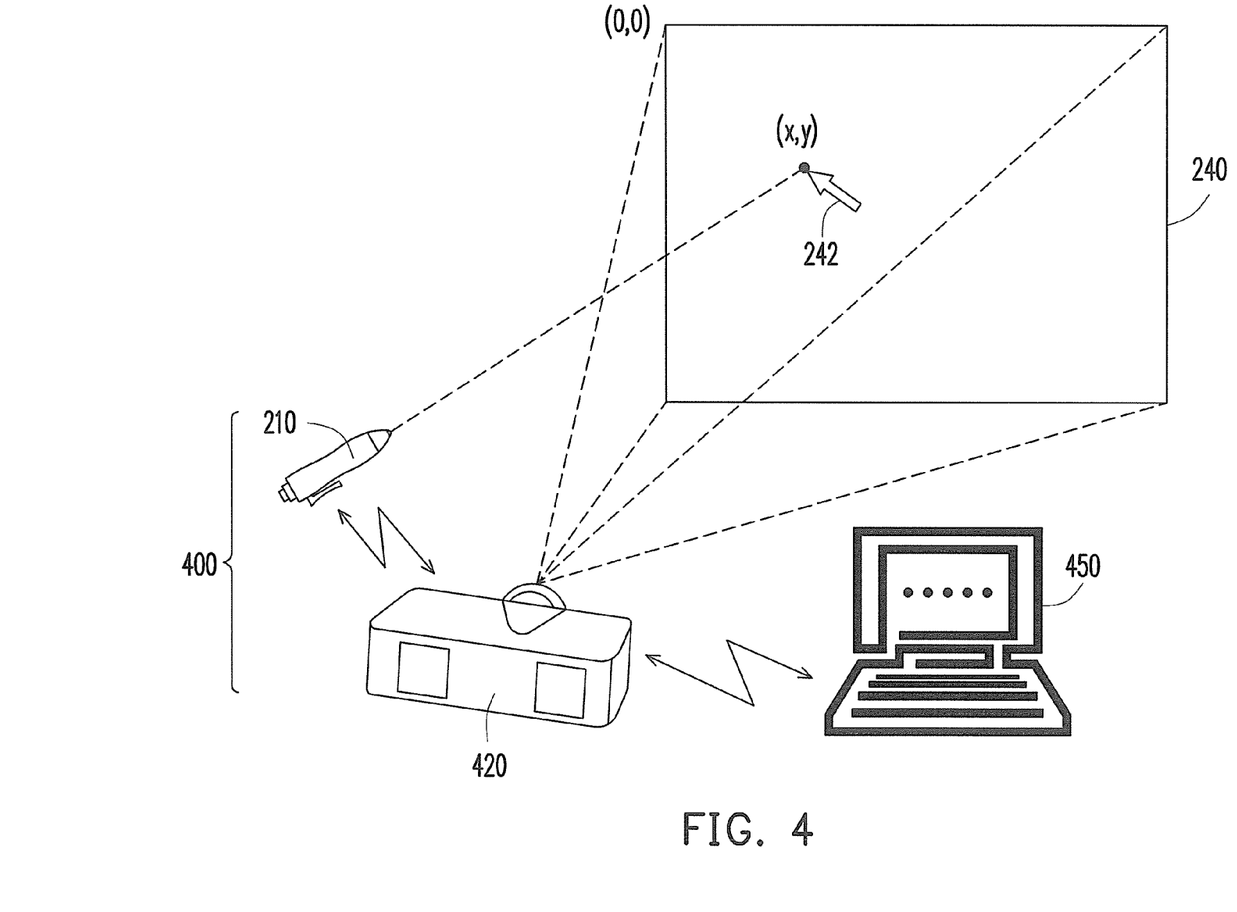
FIG. 4 is a diagram of a projection system according to an embodiment of the invention.
Figure 5:
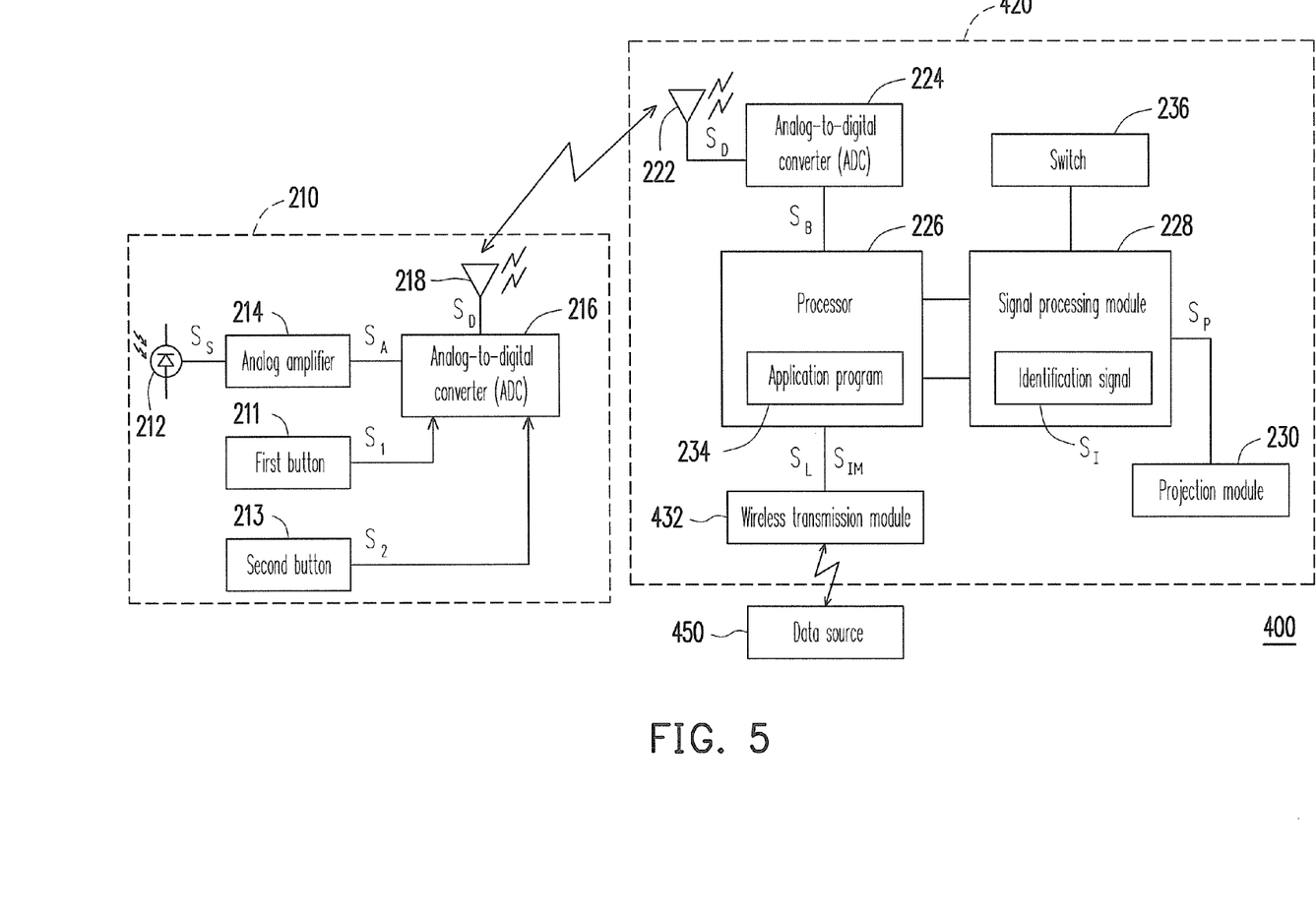
FIG. 5 is a function block diagram of the projection system of FIG. 4.

FIG. 4 is a diagram of a projection system according to an embodiment of the invention. FIG. 5 is a function block diagram of the projection system 400 of FIG. 4. Referring to FIGS. 4 and 5, a projection system 400 has an optical sensor 210 and a projector 420. The major difference between the projector 420 of FIG. 4 and the projector 220 of FIG. 2 is that the transmission interface 232 of the projector 220 is replaced by a wireless transmission module 432 of the projector 420. By establishing a connection between the wireless transmission module 432 and the data source 450, the projector 420 receives the image signal $S_{IM}$ from the data source 450 and transmits the position message $S_L$ to the data source 450. Besides, the functions of each component of the projection system 400 are the same as that of the projection system 200, which is omitted to describe. The transmission protocol adopted by the wireless transmission module 432 includes wireless transmission protocols, such as IEEE 802.11, WiFi or Bluetooth.

Figure 6:
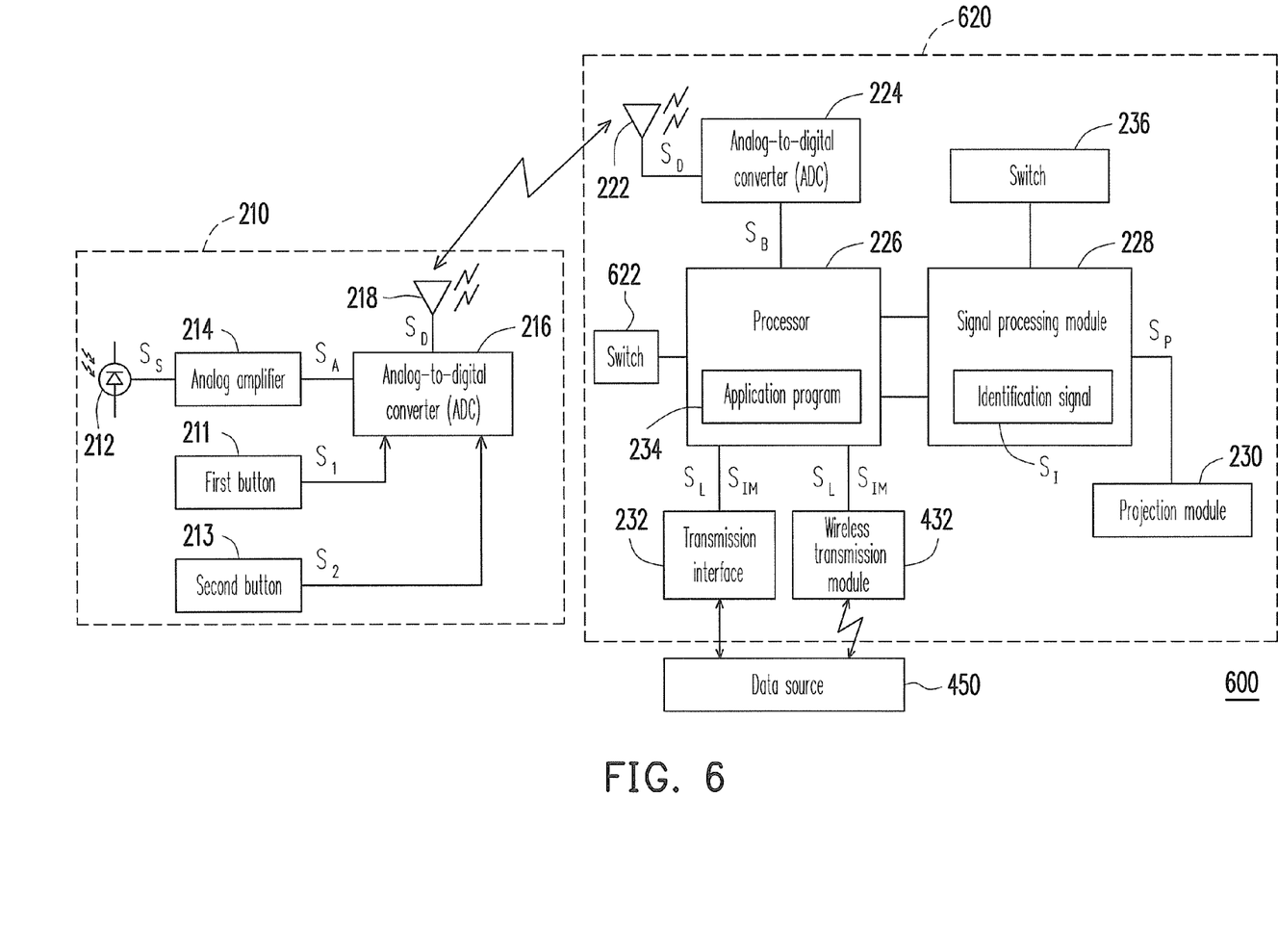
FIG. 6 is a function block diagram of a projection system according to an embodiment of the invention.

FIG. 6 is a function block diagram of a projection system 600 according to an embodiment of the invention. Referring to FIG. 6, the projection system 600 has an optical sensor 210 and a projector 620. The major difference between the projector 620 and the projector 420 is that the projector 620 further has a wireless transmission module 432, a transmission interface 232 and a switch 622. The switch 622 is coupled to the processor 226 for controlling the processor 226 to enable the wireless transmission module 432 or enable the transmission interface 232. In more details, when the switch 622 is turned off, the processor 226 enables the transmission interface 232 and disables the wireless transmission module 432, which makes the projector 620 receive the image signal $S_{IM}$ from the data source 450 via a wire and transmits the position message $S_L$ to the data source via a wire; when the switch 622 is turned on, the processor 226 enables the wireless transmission module 432 and disables the transmission interface 232, which makes the projector 620 receive the image signal $S_{IM}$ from the data source 450 in wireless transmission way and transmits the position message $S_L$ to the data source 450. Besides, the functions of each component of the projection system 600 are the same as that of the projection system 400, which is omitted to describe.

Figure 7:
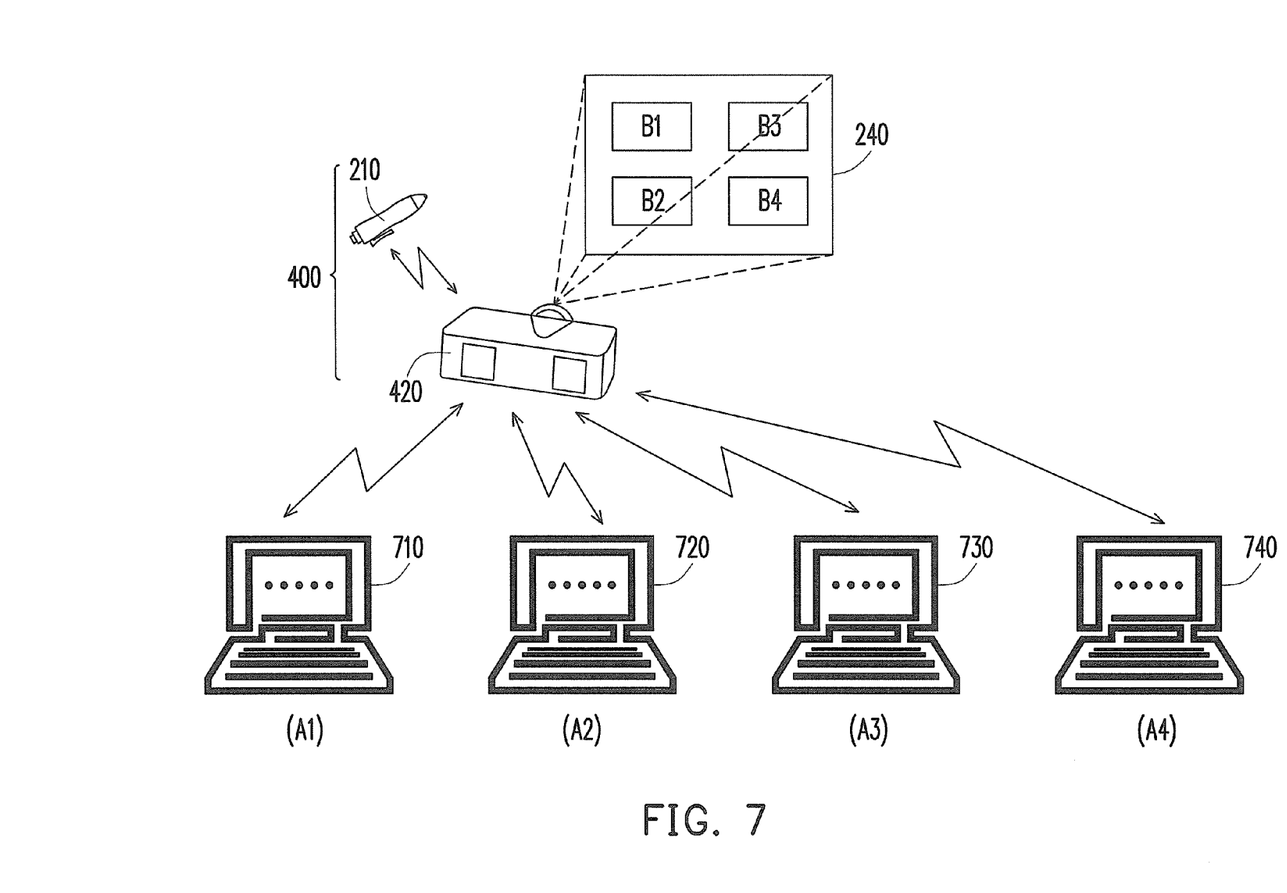
FIG. 7 is a diagram showing a projection system receives an image signal from a chosen one of a plurality of data sources according to an embodiment of the invention.

In all embodiments of the invention, FIG. 7 is a diagram showing a projection system 400 may receive image signals from a plurality of data sources 710, 720, 730 and 740 according to an embodiment of the invention. Each of the data sources 710, 720, 730 and 740 may synchronously and wirelessly connect to the projection system 400, the projector 420 would display a plurality of display blocks B1-B4 in the projected projection image 240. In another embodiment, the projector 420 may choose one of a plurality of data sources 710, 720, 730 and 740 to receive the image signal $S_{IM}$ from a chosen one of a plurality of data sources 710, 720, 730 and 740. Referring to FIG. 7, the display blocks B1-B4 are respectively corresponding to the data sources 710, 720, 730 and 740. For example, the display block B1 is corresponding to the data source 710, the display block B2 is corresponding to the data source 720, the display block B3 is corresponding to the data source 730 and the display block B4 is corresponding to the data source 740. The user may choose a desired display block by the optical sensor 210 so as to control the projector 420 to project a frame of a corresponding data source. When any one of the above-mentioned display blocks B1-B4 is chosen, the data source 710, 720, 730 or 740 corresponding to the chosen display block would wirelessly transmit the image signal $S_{IM}$ to the projector 420, so that the projector 420 updates the projection image 240 according to the received image signal $S_{IM}$.

Figure 8:
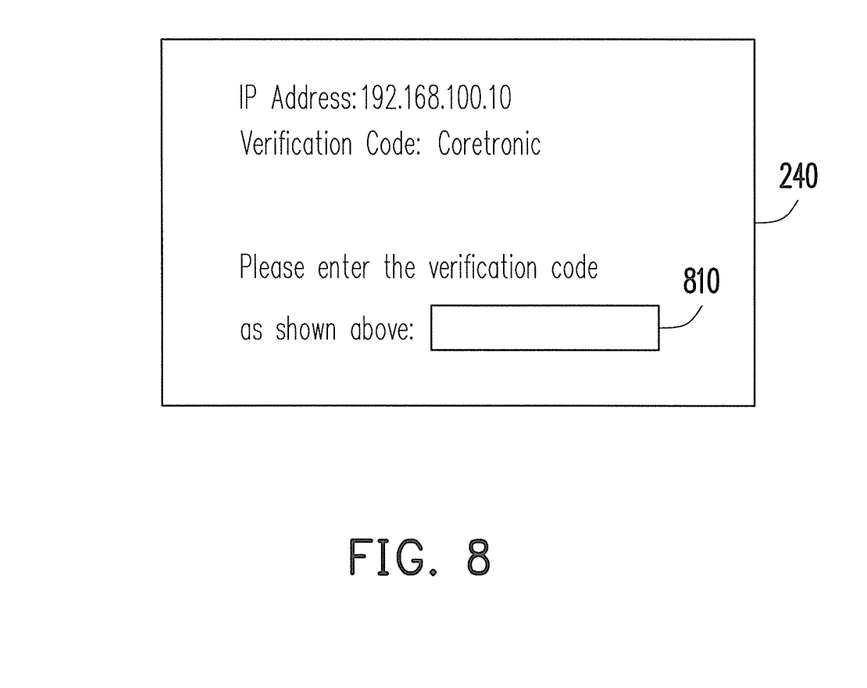
FIG. 8 is a diagram showing a projection image when a wireless connection between the projection system and the data source is established according to an embodiment of the invention.

In an embodiment of the invention, when a wireless connection is established between the projector and the data source, the projector would display a related message in the projected projection image by the projector to ask the user to enter the related message so as to confirm whether or not to establish a wireless connection between the projector and the data source. FIG. 8 is a diagram showing a projection image 240 when a wireless connection between the projection system and the data source is established according to an embodiment of the invention. Referring to FIG. 8, in the projection image 240, an IP address of the data source assigned by the projector and a verification code are shown. At the time, the user only enters the verification code "Coretronic" displayed in the projection image 240 in the input block 810, then, the projector may thereby conclude it is needed to receive the image signal $S_{IM}$ from the data source with the above-mentioned IP address. However, if the verification code entered by the user does not conform to the verification code displayed in the projection image 240, the projector would cut off the wireless connection between the projector and the data source with the above-mentioned IP address.

In summary, the embodiments of the invention have at least one of the following advantages. The optical device in the embodiments of the invention has an optical sensor. The optical sensor senses an identification signal of the projection image of the projector and transmits the identification signal to the projector. In addition, the projection system in the above-mentioned embodiments of the invention has an optical sensor and a projector. The optical sensor senses an identification signal of the projection image projected by the projector and transmits the identification signal to the projector, so that the projector determines the pointed position in the projection image by the optical sensor according to the identification signal. Hence, the cursor on the projection image would move following the variation of the pointed position in the projection image by the optical sensor. In this way, the user is able to wirelessly control the moving of the cursor on the frame so as to make the user more convenient for a presentation demo.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical device capable of controlling a projector, wherein the projector is capable of receiving an image signal from a data source, combining an identification signal into the image signal to generate a projection signal, and projecting a projection image according to the projection signal; the optical device comprising:
   an optical sensor capable of sensing the identification signal of the projection image, outputting a detection signal corresponding to the identification signal and wirelessly transmitting the detection signal to the projector, wherein the identification signal comprises a coordinate message,
   wherein the projector wirelessly connects a plurality of data sources, the projector displays a plurality of display blocks in the projection image, and the display blocks are respectively corresponding to the data sources, and when one of the display blocks is chosen, the data source corresponding to the chosen display block would transmit the image signal of the data source to the projector.

2. The optical device as claimed in claim 1, wherein the optical sensor comprises:
   a photosensitive component capable of sensing a light from a position at where the optical device point in the projection image so as to output a sensed signal;

an analog amplifier coupled to the photosensitive component and capable of amplifying the sensed signal to generate an amplified signal;

an analog-to-digital converter coupled to the analog amplifier and capable of converting the amplified signal into the detection signal; and a wireless transmission module coupled to the analog-to-digital converter and capable of wirelessly transmitting the detection signal to the projector.

3. The optical device as claimed in claim 2, wherein the photosensitive component is a photodiode.

4. The optical device as claimed in claim 1, wherein the optical sensor comprises at least one button capable of generating a control signal, the optical sensor wirelessly transmits the control signal to the projector with the detection signal.

5. A projection system, comprising:

a projector capable of receiving an image signal from a data source, combining an identification signal into the image signal to generate a projection signal, and projecting a projection image according to the projection signal; and an optical sensor capable of sensing the identification signal of the projection image, outputting a detection signal corresponding to the identification signal and wirelessly transmitting the detection signal to the projector, wherein the identification signal comprises a coordinate message, and the projector determines a pointed position in the projection image by the optical sensor according to the detection signal so as to output a position message to the data source, wherein the projector wirelessly connects a plurality of data sources, the projector displays a plurality of display blocks in the projection image, and the display blocks are respectively corresponding to the data sources, and when one of the display blocks is chosen, the data source corresponding to the chosen display block would transmit the image signal of the data source to the projector.

6. The projection system as claimed in claim 5, wherein the optical sensor comprises:

a photosensitive component capable of sensing a light from the pointed position in the projection image so as to output a sensed signal;

an analog amplifier coupled to the photosensitive component and capable of amplifying the sensed signal to generate an amplified signal;

an analog-to-digital converter coupled to the analog amplifier and capable of converting the amplified signal into the detection signal; and a wireless transmission module coupled to the analog-to-digital converter and capable of wirelessly transmitting the detection signal to the projector.

7. The projection system as claimed in claim 6, wherein the photosensitive component is a photodiode.

8. The projection system as claimed in claim 5, wherein the projector comprises:

a first wireless transmission module capable of receiving the detection signal from the optical sensor;

an analog-to-digital converter coupled to the first wireless transmission module and capable of converting the detection signal into a digital signal;

a processor coupled to the analog-to-digital converter and capable of processing the image signal and a position message generated according to the digital signal;

a signal processing module coupled to the processor and capable of combining the identification signal into the image signal so as to generate the projection signal;

a projection module coupled to the signal processing module and capable of projecting the projection image according to the projection signal; and a second wireless transmission module coupled to the processor and capable of wirelessly transmitting the position message to the data source and receiving the image signal from the data source.

9. The projection system as claimed in claim 5, wherein the optical sensor comprises at least one button capable of generating a control signal, the optical sensor wirelessly transmits the control signal to the projector with the detection signal, and the projector transmits the control signal to the data source, so as to control the operation of the data source.

* * * * *